US011012964B2

(12) United States Patent
Korhonen et al.

(10) Patent No.: US 11,012,964 B2
(45) Date of Patent: May 18, 2021

(54) TIMING ADVANCE CONTROL FOR IAB

(71) Applicant: Nokia Technologies Oy, Espoo (FI)

(72) Inventors: Juha S. Korhonen, Espoo (FI); Keeth S. Jayasinghe, Espoo (FI); Ilkka Keskitalo, Oulu (FI); Esa T. Tiirola, Kempele (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/665,850

(22) Filed: Oct. 28, 2019

(65) Prior Publication Data

US 2020/0145952 A1 May 7, 2020

Related U.S. Application Data

(60) Provisional application No. 62/754,891, filed on Nov. 2, 2018.

(51) Int. Cl.
*H04W 56/00* (2009.01)

(52) U.S. Cl.
CPC ..... *H04W 56/0045* (2013.01); *H04W 56/007* (2013.01)

(58) Field of Classification Search
CPC ........... H04W 56/0045; H04W 56/007; H04W 74/0833; H04W 84/04; H04W 88/08; H04W 56/0005; H04W 56/001; H04W 56/002; H04W 56/0025; H04W 56/00; H04W 74/08; H04B 7/15; H04B 7/15528
USPC ......................................................... 370/336
See application file for complete search history.

(56) References Cited

U.S. PATENT DOCUMENTS

| 2017/0331577 A1* | 11/2017 | Parkvall | H04J 11/0079 |
| 2018/0092139 A1* | 3/2018 | Novlan | H04W 56/001 |
| 2018/0192443 A1* | 7/2018 | Novlan | H04W 76/11 |
| 2019/0053193 A1* | 2/2019 | Park | H04W 72/02 |

(Continued)

FOREIGN PATENT DOCUMENTS

| WO | WO-2020072851 A1 * | 4/2020 | H04W 84/04 |
| WO | WO-2020086826 A1 * | 4/2020 | H04W 84/04 |

OTHER PUBLICATIONS

C. Madapatha et al., "On Integrated Access and Backhaul Networks: Current Status and Potentials," in IEEE Open Journal of the Communications Society, vol. 1, pp. 1374-1389, 2020, doi: 10.1109/OJCOMS.2020.3022529. (Year: 2020).*

(Continued)

*Primary Examiner* — Nathan S Taylor
(74) *Attorney, Agent, or Firm* — Nokia Technologies Oy

(57) ABSTRACT

In accordance with an example embodiment of the present invention, a method comprising: receiving an indication of a timing difference over a wireless backhaul link, the indication received at a first node in a wireless communication system and received from a second node in the wireless communication system, the timing difference between a first time at which the second node received uplink signal on the wireless backhaul link from the first node and a second time at which the second node transmitted downlink signal on the wireless backhaul link to the first node; determining by the first node a new timing advance based on a current timing advance and on the received timing difference; and using the determined new timing advance for one or more transmissions by the first node over one or more wireless links.

16 Claims, 9 Drawing Sheets

(56) References Cited

U.S. PATENT DOCUMENTS

| | | | | |
|---|---|---|---|---|
| 2019/0159156 A1* | 5/2019 | Abedini | ............ | H04W 74/0833 |
| 2020/0053682 A1* | 2/2020 | Abedini | .............. | H04W 56/002 |
| 2020/0053712 A1* | 2/2020 | Josan | .................... | H04W 76/00 |
| 2020/0059879 A1* | 2/2020 | Nam | ..................... | H04W 76/27 |
| 2020/0100298 A1* | 3/2020 | Pan | ................... | H04W 74/0833 |
| 2020/0413363 A1* | 12/2020 | Park | ................. | H04W 56/0045 |

OTHER PUBLICATIONS

B. Zhang, F. Devoti and I. Filippini, "RL-based Resource Allocation in mmWave 5G IAB Networks," 2020 Mediterranean Communication and Computer Networking Conference (MedComNet), Arona, Italy, 2020, pp. 1-8, doi: 10.1109/MedComNet49392.2020.9191546. (Year: 2020).*

O. Teyeb, A. Muhammad, G. Mildh, E. Dahlman, F. Barac and B. Makki, "Integrated Access Backhauled Networks," 2019 IEEE 90th Vehicular Technology Conference (VTC2019-Fall), Honolulu, HI, USA, 2019, pp. 1-5, doi: 10.1109/VTCFall.2019.8891507. (Year: 2019).*

"New SID Proposal: Study on Integrated Access and Backhaul for NR", 3GPP TSG RAN meeting #80, RP-181349, Agenda : 9.4.5, Jun. 11-15, 2018, 5 pages.

"3rd Generation Partnership Project; Technical Specification Group Radio Access Network; Network Assistance for Network Synchronization (Release 14)", 3GPP TR 36.898 V14.0.0, Jan. 2017, pp. 1-25.

"New SID Proposal: Study on Integrated Access and Backhaul for NR", 3GPP TSG RAN Meeting #78, RP-172290, Agenda : 9.3.6, AT&T, Dec. 18-21, 2017, 5 pages.

"Final Report of 3GPP TSG RAN WG1 #93 v1.0.0", 3GPP TSG RAN WG1 Meeting #94, R1-1808001, MCC Support, Aug. 20-24, 2018, pp. 1-198.

"Final Report of 3GPP TSG RAN WG1 #94 v1.0.0", 3GPP TSG RAN WG1 Meeting #94bis, R1-1810051, MCC Support, Oct. 8-12, 2018, pp. 1-194.

"Final Report of 3GPP TSG RAN WG1 #94bis v1.0.0", 3GPP TSG RAN WG1 Meeting #95, R1-1812101, MCC Support, Nov. 12-16, 2018, pp. 1-197.

* cited by examiner

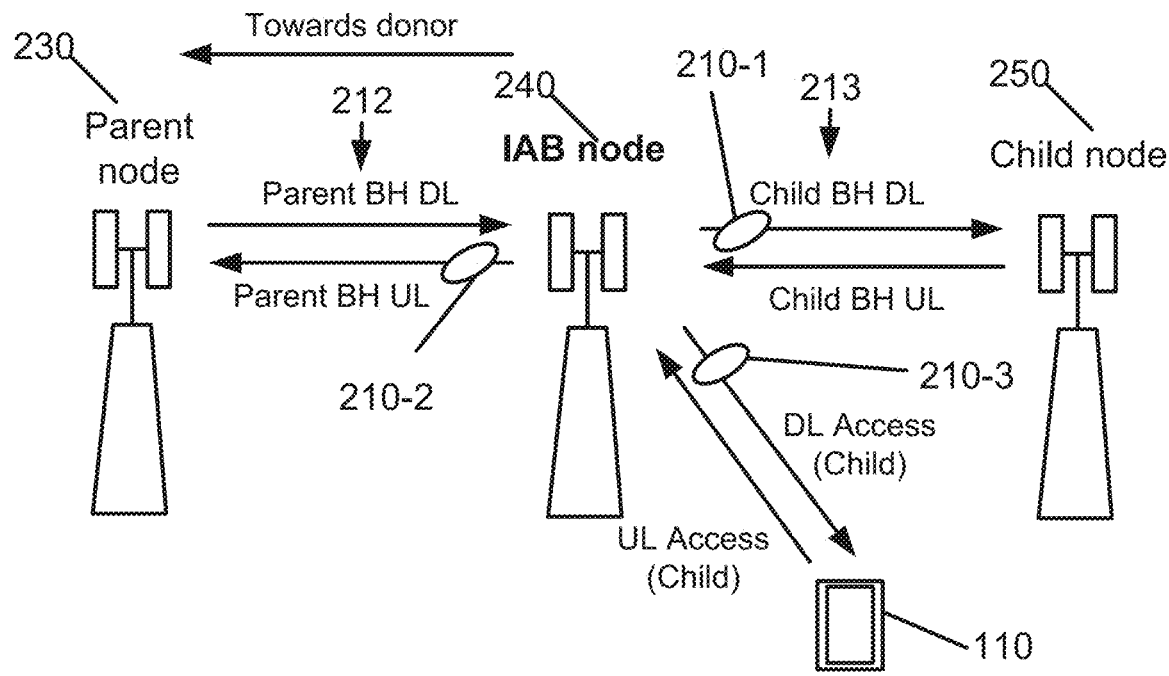
FIG. 2A: IAB node transmitting
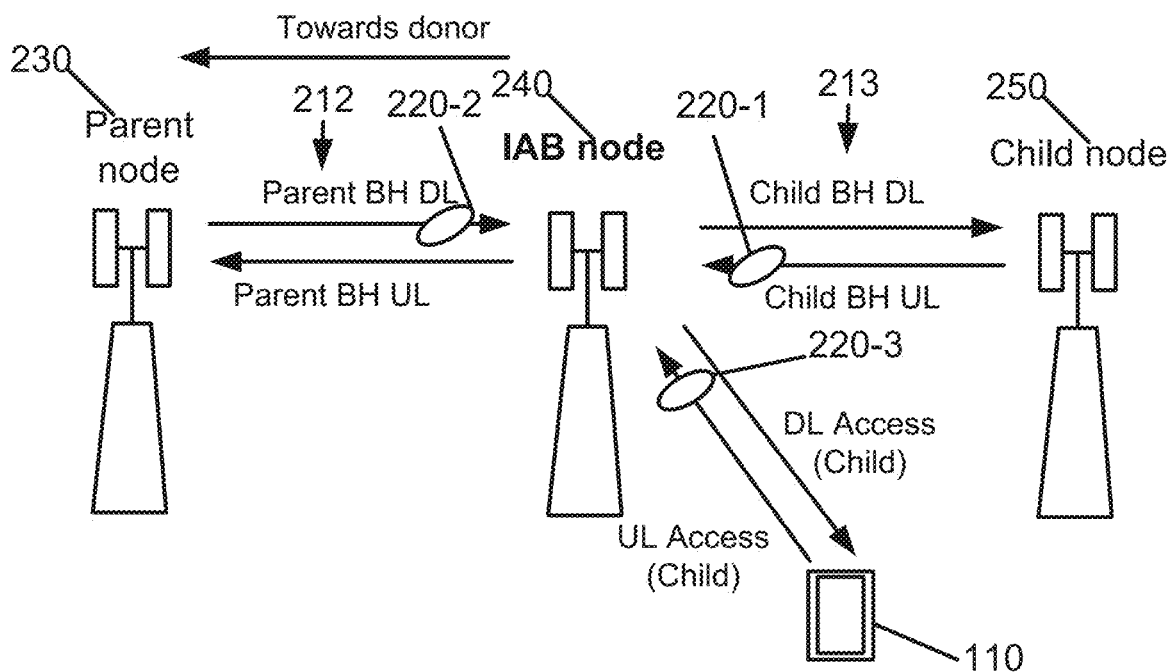
FIG. 2B: IAB node receiving

TIMING ADVANCE CONTROL FOR IAB

TECHNICAL FIELD

This invention relates generally to timing advance in wireless communication systems and, more specifically, relates to timing advance control for integrated access and backhaul (IAB).

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, at the beginning of the detailed description section.

In the third generation partnership project (3GPP), there is a study item (SI) that concerns an Integrated Access and Backhaul (IAB) topic. IAB is a new radio (NR) Rel-15/16 Study Item (see, e.g., RP-172290, "New SID Proposal: Study on Integrated Access and Backhaul for NR", 3GPP TSG RAN Meeting #78, Lisbon, Portugal, Dec. 18-21, 2017) that will continue as a Rel. 16 work item (WI) in 2019. This SI states the justification for the SI is as follows: "One of the potential technologies targeted to enable future cellular network deployment scenarios and applications is the support for wireless backhaul and relay links enabling flexible and very dense deployment of NR cells without the need for densifying the transport network proportionately."

In systems with IAB, there is usually a donor node that has a very high speed connection (e.g., a fiber optics link) to the core network of a wireless, cellular communication system. The donor node is also typically a base station (e.g., a gNB or eNB) that can connect user equipment (UEs) to the wireless network. In an IAB scenario, the donor IAB node also connects wirelessly via a backhaul (BH) link to one or more IAB nodes. A donor IAB node may have multiple connections to multiple IAB nodes. In a one-hop scenario, the donor IAB node connects to IAB nodes that do not have any child IAB nodes to serve. In a two-hop scenario the donor IAB node connects to (e.g., first) IAB nodes so that some of the first nodes may have connection to second IAB nodes that do not have direct connection to the donor IAB node. Thus, there are two wireless BH hops between the second IAB node and the donor IAB node. The donor is a parent node for the first IAB node while the second node is a child node for the first IAB node. Similarly, the first IAB node is a parent node for the second IAB node. The IAB nodes may also be nodes (e.g., gNBs or eNBs, or distributed units, DUs, with a split base station architecture) serving their own cells, and they provide access by UEs to the wireless network.

A benefit of the IAB scenarios is that it is easier to add IAB nodes that connect via wireless BH links to the donor IAB node than it is to add IAB nodes that connect via wired BH links to the donor IAB node. A detriment is that wireless BH links have timing issues that can be difficult to address.

SUMMARY

Various aspects of examples of the invention are set out in the claims.

According to a first aspect of the present invention, a method comprising: receiving an indication of a timing difference over a wireless backhaul link, the indication received at a first node in a wireless communication system and received from a second node in the wireless communication system, the timing difference between a first time at which the second node received uplink signal on the wireless backhaul link from the first node and a second time at which the second node transmitted downlink signal on the wireless backhaul link to the first node; determining by the first node a new timing advance based on a current timing advance and on the received timing difference; and using the determined new timing advance for one or more transmissions by the first node over one or more wireless links.

According to a second aspect of the present invention, an apparatus comprising: at least one processor; and at least one memory including computer program code, wherein the at least one memory and the computer program code are configured to, with the at least one processor, cause the apparatus to at least: receive an indication of a timing difference over a wireless backhaul link, the indication received at a first node in a wireless communication system and received from a second node in the wireless communication system, the timing difference between a first time at which the second node received uplink signal on the wireless backhaul link from the first node and a second time at which the second node transmitted downlink signal on the wireless backhaul link to the first node; determine by the first node a new timing advance based on a current timing advance and on the received timing difference; and use the determined new timing advance for one or more transmissions by the first node over one or more wireless links.

According to a third aspect of the present invention, a non-transitory computer storage medium encoded with a computer program, the program comprising instructions that when executed by one or more computers cause the one or more computers to perform operations comprising: receiving an indication of a timing difference over a wireless backhaul link, the indication received at a first node in a wireless communication system and received from a second node in the wireless communication system, the timing difference between a first time at which the second node received uplink signal on the wireless backhaul link from the first node and a second time at which the second node transmitted downlink signal on the wireless backhaul link to the first node; determining by the first node a new timing advance based on a current timing advance and on the received timing difference; and using the determined new timing advance for one or more transmissions by the first node over one or more wireless links.

According to a fourth aspect of the present invention, a method comprising: receiving, from a first node and at a second node, uplink signal on a wireless backhaul link between the first and second nodes, wherein the first and second nodes are in a wireless communication system; determining, at the second node, a first time at which the uplink signal was received; determining, at the second node, a second time at which the second node transmitted a downlink signal; determining, at the second node, a timing difference between the first time and the second time; transmitting, from the second node, an indication of the timing difference toward the first node for the first node to use in determining a timing advance for timing of transmissions by the first node to another node over one or more wireless links.

According to a fifth aspect of the present invention, an apparatus comprising: at least one processor; and at least one memory including computer program code, wherein the at least one memory and the computer program code are configured to, with the at least one processor, cause the apparatus to at least: receive, from a first node and at a second node, uplink signal on a wireless backhaul link between the first and second nodes, wherein the first and second nodes are in a wireless communication system; determine, at the second node, a first time at which the uplink signal was received; determine, at the second node, a second time at which the second node transmitted a downlink signal; determine, at the second node, a timing difference between the first time and the second time; transmit, from the second node, an indication of the timing difference toward the first node for the first node to use in determining a timing advance for timing of transmissions by the first node to another node over one or more wireless links, wherein the apparatus is comprised in the second node.

According to a sixth aspect of the present invention, a non-transitory computer storage medium encoded with a computer program, the program comprising instructions that when executed by one or more computers cause the one or more computers to perform operations comprising: receiving, from a first node and at a second node, uplink signal on a wireless backhaul link between the first and second nodes, wherein the first and second nodes are in a wireless communication system; determining, at the second node, a first time at which the uplink signal was received; determining, at the second node, a second time at which the second node transmitted a downlink signal; determining, at the second node, a timing difference between the first time and the second time; transmitting, from the second node, an indication of the timing difference toward the first node for the first node to use in determining a timing advance for timing of transmissions by the first node to another node over one or more wireless links.

BRIEF DESCRIPTION OF THE DRAWINGS

In the attached Drawing Figures:

FIG. 2A illustrates an IAB FDM/SDM scenario for an IAB node transmitting;

FIG. 2B illustrates an IAB FDM/SDM scenario for an IAB node receiving;

DETAILED DESCRIPTION OF THE DRAWINGS

Figure 1A:
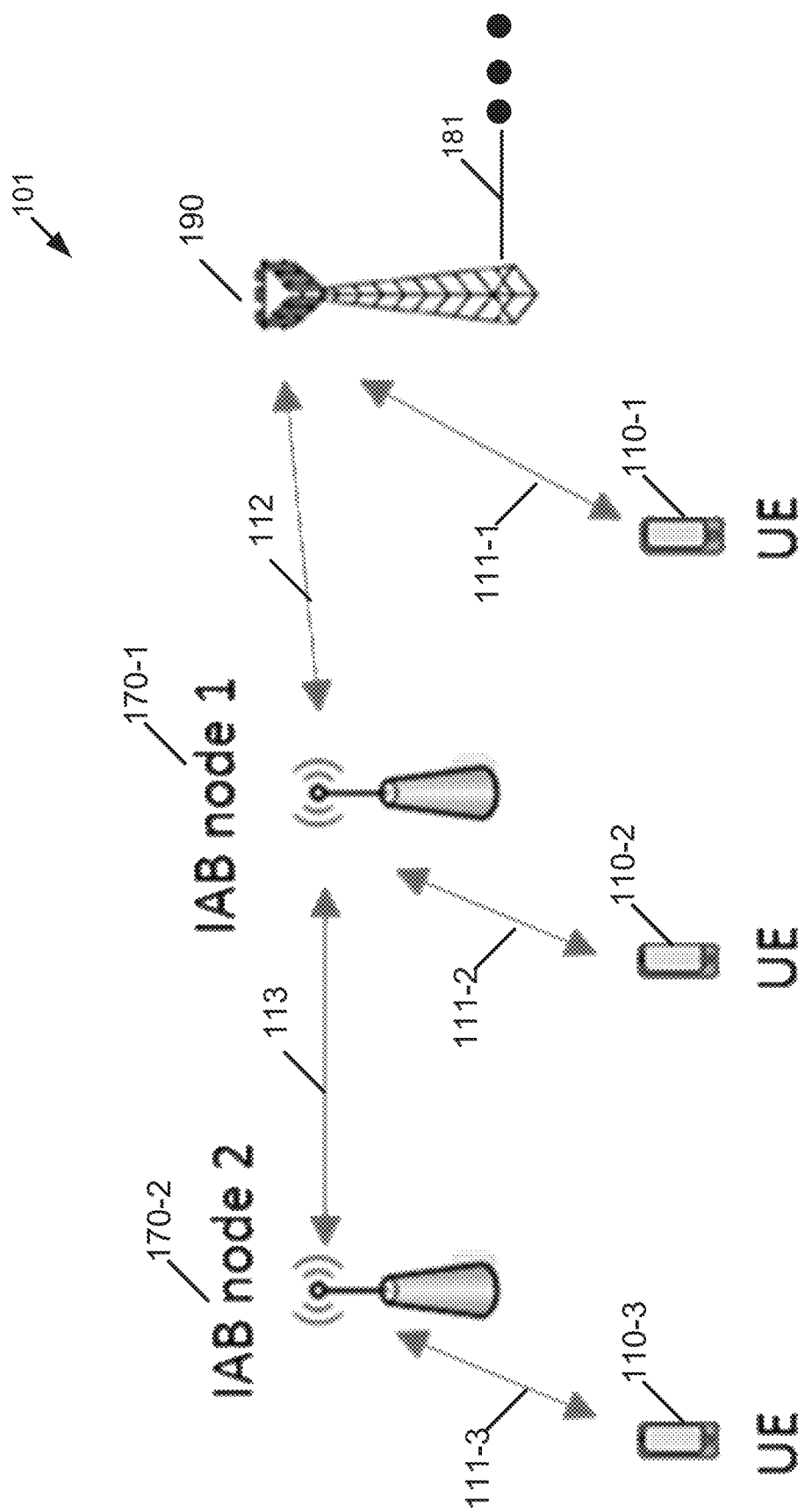
FIG. 1A is an illustration of a two-hop IAB network.

The following abbreviations that may be found in the specification and/or the drawing figures are defined as follows:
    3GPP third generation partnership project
    5G fifth generation
    5GC 5G core network
    AMF access and mobility management function
    BH backhaul
    CE control element
    CPC computer program code
    CU central unit
    DL downlink
    DRB data radio bearer
    DU distributed unit
    eNB (or eNodeB) evolved Node B (e.g., an LTE base station)
    EN-DC E-UTRA-NR dual connectivity
    en-gNB or En-gNB node providing NR user plane and control plane protocol terminations towards the UE, and acting as secondary node in EN-DC
    E-UTRA evolved universal terrestrial radio access, i.e., the LTE radio access technology
    FDM frequency division multiplexing
    gNB (or gNodeB) base station for 5G/NR, i.e., a node providing NR user plane and control plane protocol terminations towards the UE, and connected via the NG interface to the 5GC
    IAB integrated access and backhaul
    I/F interface
    info information
    LTE long term evolution
    MAC medium (or media) access control
    MME mobility management entity
    MT mobile termination or mobile terminated
    ng or NG new generation
    ng-eNB or NG-eNB new generation eNB
    NR new radio
    N/W or NW network
    OTA over the air
    PA power amplifier
    PDCP packet data convergence protocol
    PHY physical layer
    PUSCH physical uplink shared channel
    RACH random access channel
    RAN radio access network
    RAR random access response
    Rel release
    RAR random access response
    RLC radio link control
    RRH remote radio head
    RRC radio resource control
    RRM radio resource management
    RTT round trip time
    RU radio unit
    Rx or RX receiver or reception
    SDAP service data adaptation protocol
    SDM space division multiplexing
    SFN subframe number SGW serving gateway
SI study item
SMF session management function
TA timing advance
TDM time division multiplexing
TP propagation delay
TRP transmission/reception (or Tx/Rx) point
TS technical specification
Tx or TX transmitter or transmission
UE user equipment (e.g., a wireless, typically mobile device)
UL uplink
UP user plane
UPF user plane function
WI work item The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

In IAB deployments, the traffic from IAB nodes is wirelessly backhauled between an IAB node and an IAB donor, or another IAB node, using an established backhaul (BH) network topology. An IAB node has BH links towards parent and child IAB nodes, and an IAB node may also serve UEs with access links as shown in FIG. 1A. FIG. 1A is an illustration of a two-hop IAB network 101. In FIG. 1A, the parent of IAB node 1 170-1 is a donor node 190 that has a wired BH connection on link 181 and IAB node 1 170-1 provides a wireless backhaul connection over link 112 for its child IAB node 2 170-2. In addition, all the nodes 190, 170-1, and 170-2 may directly serve corresponding UEs. 110-1, 110-2, and 110-3, respectively, via corresponding wireless links 111-1, 111-2, 111-3.

In the network 101 of FIG. 1A, the IAB node 1 170-1 has the following links to support: DL and UL for access UEs 110-2 over link 111-2; receiving parent BH DL over link 112 from the donor node 190; transmitting parent BH UL to the donor node 190 over link 112, transmitting child BH DL over link 113 to the child IAB node 2 170-2; and receiving child BH UL over link 113 from the child IAB node 2 170-2.

Additional description regarding this network 101 or parts of it and additional comments are made after a system into which the exemplary embodiments may be used is described.

Figure 1B:
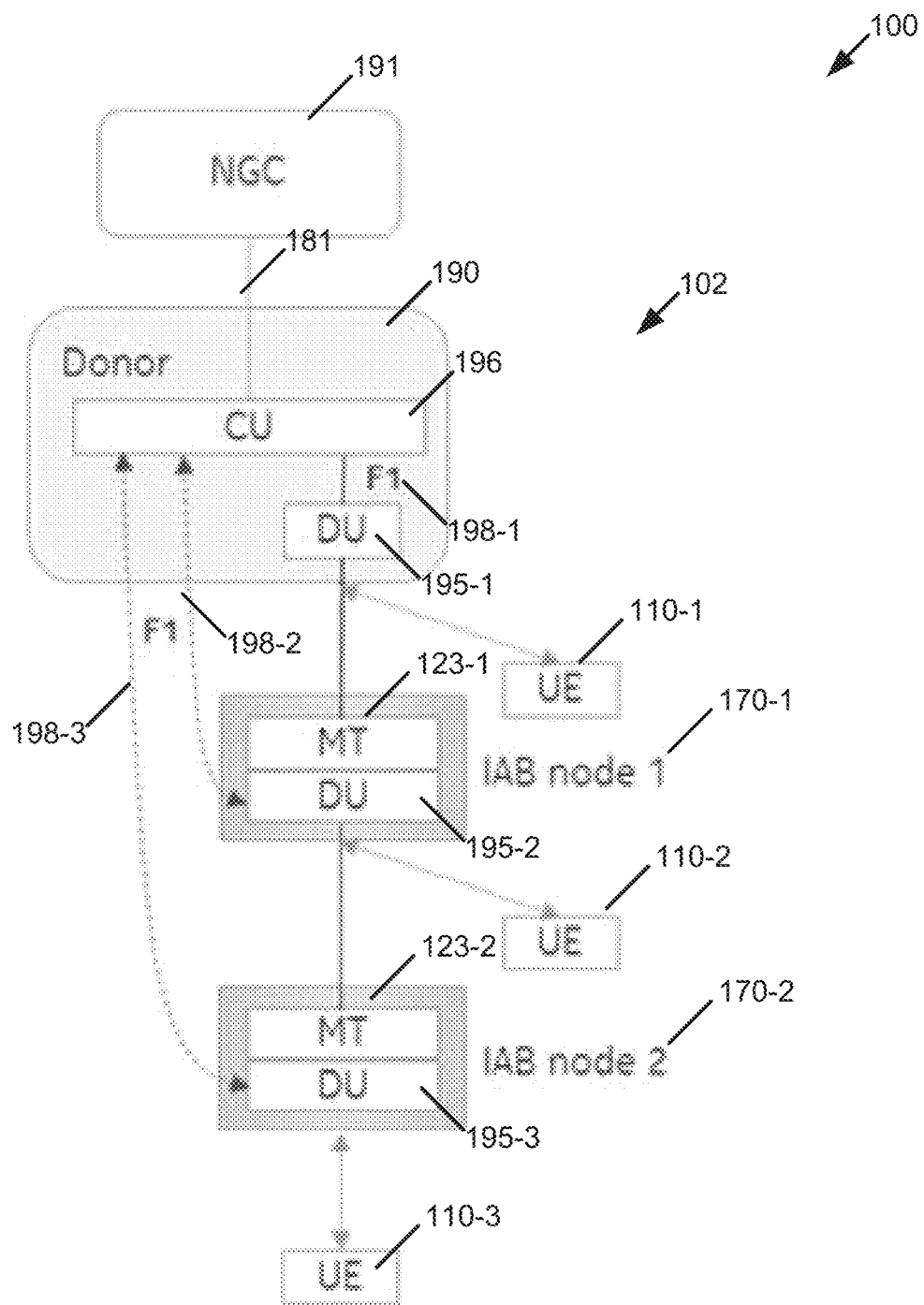
FIG. 1B illustrates an IAB architecture in a wireless communication system applying a CU/DU split where the CU is located in the Donor and each IAB node hosts a DU part.

Turning to FIG. 1B, FIG. 1B illustrates an IAB architecture 102 in a wireless communication system 100 applying a CU/DU split where a CU is located in the Donor and each IAB node hosts a DU part. Specifically, there is a 5G core network (NGC) 191 to which the IAB donor node 190 connects via a link 181. The IAB architecture 102 is similar to two-hop IAB network 101, but is directed to a type of 5G architecture. The IAB architecture 102 comprises the IAB donor node 190 and the two IAB nodes 170. The IAB donor node 190 comprises a central unit (CU) 196 and a distributed unit (DU) 195-1. The CU 196 is a logical node hosting SDAP and PDCP user plane protocols of an IAB node such as a gNB, and RRC protocol on the control plane of the gNB that controls the operation of one or more DUs and access UEs. The CU 196 terminates the F1 interface 198-1 connected with the DU 195-1. A DU 195 is a logical node hosting RLC, MAC and PHY layers of the gNB, and its operation is partly controlled by a CU 196. One CU 196 supports one or multiple cells. Each IAB node 170-1, 170-2 comprises Mobile Termination (MT) functional entity 123-1, 123-2 (referred to mainly as MT 123 herein), respectively, and a DU 195-2, 195-3, respectively.

Each IAB node 170-1, 170-2 has a corresponding MT 123-1, 123-2, which is establishing the connection to the serving (parent) node for control signaling and user plane data transmission, carries out RRM measurements and related reporting to the serving node, and performs generally similar functions as the access UEs have typically performed. The user plane (UP) connection is used to carry BH data and also the respective logical F1 interface 198-2, 198-3 towards the donor CU 196. During the initial access when a corresponding IAB node 170 is powered up, the corresponding MT 123 scans the detectable cells and selects the best cell to initiate connection set up. The procedure is started with the random access procedure by sending the RACH preamble to the selected node, which responds with the RAR (random access response) message including the initial time alignment information that the MT shall apply in the consequent UL transmissions. The procedure continues by establishing signaling connections and eventually data radio bearers (DRBs) to carry backhaul data and an F1 connection 198. While being in active operation, the IAB node MT 123 shall maintain the connection to the serving (parent) node(s) while performing RRM measurements to detect potential need for a BH link change in case the radio connection is lost or weakened on the active BH connection. Although not shown in the figures, an IAB node may have multi-connectivity to more than one parent node for improved reliability. Or, in addition to one active connection to a parent node, there may be other connections prepared and/or maintained for rapid BH link change. The MT 123 also receives the timing advance (TA) commands from the serving node to adjust the timing of the UL BH link.

Figure 1C:
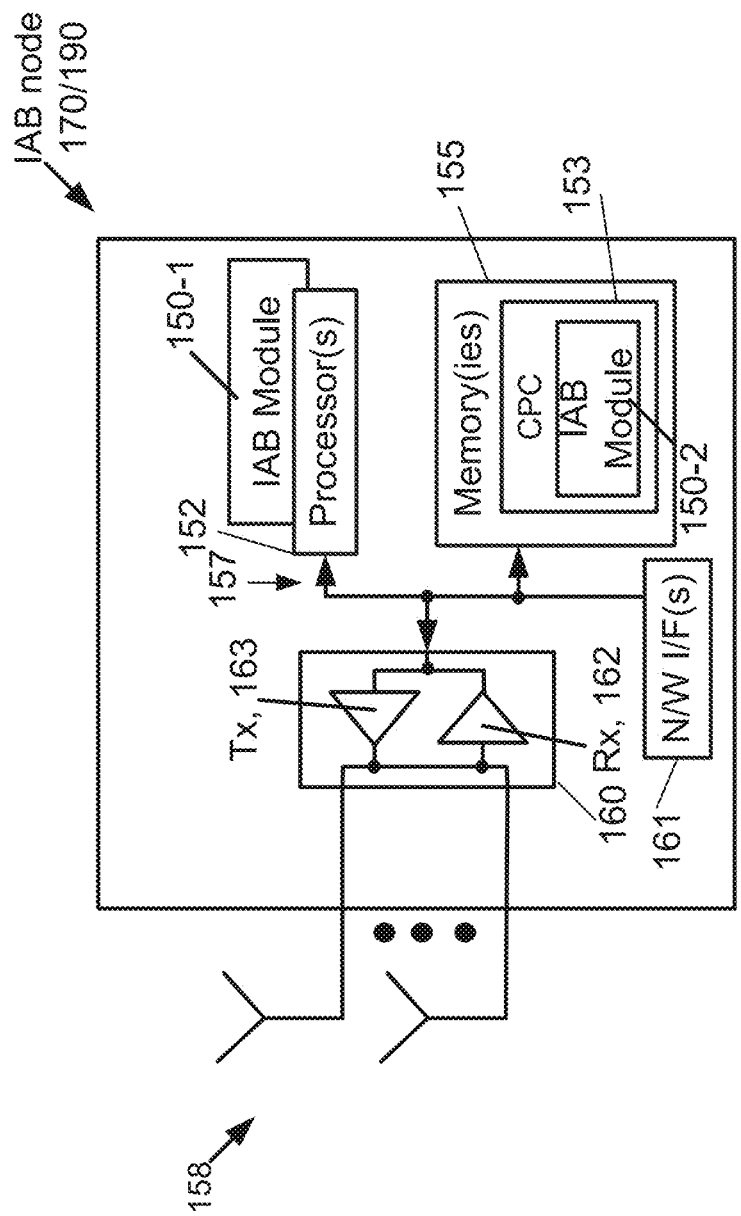
FIG. 1C is a block diagram of possible internal structure of an IAB node.

Turning to FIG. 1C, this figure is a block diagram of possible internal structure of an IAB node. Each IAB node 170/190 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153.

The IAB node 170/190 includes an IAB module 150, comprising one of or both parts 150-1 and/or 150-2, which may be implemented in a number of ways. The IAB module 150 may be implemented in hardware as IAB module 150-1, such as being implemented as part of the one or more processors 152. The IAB module 150-1 may be implemented also as an integrated circuit or through other hardware such as a programmable gate array. In another example, the IAB module 150 may be implemented as IAB module 150-2, which is implemented as computer program code 153 and is executed by the one or more processors 152. For instance, the one or more memories 155 and the computer program code 153 are configured to, with the one or more processors 152, cause the IAB node 170 to perform one or more of the operations as described herein.

The one or more network interfaces 161 communicate over a wired or wireless network such as via a corresponding wireless link 111, 112, and/or 112, e.g., via a transceiver 160 or via circuitry in the network interface 161. The IAB donor node 190, for instance, may use a link 181 to communicate with the NGC 191, and through this element 191 to other network(s) and/or the Internet. The one or more buses 157 may be address, data, or control buses, and may include any interconnection mechanism, such as a series of lines on a motherboard or integrated circuit, fiber optics or other optical communication equipment, wireless channels, and the like.

The wireless network 100 may include a network element or elements 191 that may include core network functionality, and which provides connectivity with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)).

Although primary emphasis is placed herein on 5G, other technology may be used. For instance, core network functionality for LTE may include MME (Mobility Management Entity)/SGW (Serving Gateway) functionality. These are merely exemplary functions that may be supported by the network element(s) 191, and note that both 5G and LTE functions might be supported. The IAB nodes 190, 170 for 5G could be gNB nodes, for instance, and for 4G be eNB nodes, or there could be a combination of gNB and eNB nodes or other base stations, e.g., for other technologies.

The computer readable memories 155 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 155 may be means for performing storage functions. The processors 152 may be of any type suitable to the local technical environment, and may include one or more of general purpose computers, special purpose computers, microprocessors, digital signal processors (DSPs) and processors based on a multi-core processor architecture, as non-limiting examples. The processors 152 may be means for performing functions, such as controlling the IAB donor node 190, IAB nodes 170, and other functions as described herein.

Having thus introduced one suitable but non-limiting technical context for the practice of the exemplary embodiments, the exemplary embodiments will now be described with greater specificity.

Regarding duplexing schemes in IAB, it has been agreed in RAN1#93 that "IAB supports TDM, FDM, and SDM between Access and BH links at an IAB node, subject to a half-duplex constraint". See: "Final Report of 3GPP TSG RAN WG1 #93 v1.0.0", Busan, South Korea, 21-25 May 2018, printed as R1-1808001, 3GPP TSG RAN WG1 Meeting #94, Gothenburg, Sweden, 20-24 Aug. 2018. SDM may be facilitated, e.g., by means of allocating separate RF beams for Backhaul (Parent link) and Access (Child link). FDM may be facilitated by means of allocating separate/non-overlapping frequency domain resources (such as physical resource blocks or bandwidth parts) for Backhaul (Parent link) and Access (Child link). Half-duplex constraint means that an IAB node 170 is not capable of receiving and transmitting at the same time. In this document, we focus on FDM/SDM scenarios, since a TDM scenario can be performed applying similar timing control as with UEs (see Case 1 below).

In the case of FDM/SDM half-duplex operation, an IAB node is either transmitting to or receiving from a UE and is also performing backhaul at the same time as shown in FIGS. 2A and 2B. In FIG. 2A, this figure illustrates an IAB FDM/SDM scenario for an IAB node transmitting. Note that the IAB node 240 is a child of the parent IAB node 230 and also a parent of the child IAB node 250. Note also that the parent node 230 could be the IAB donor node 190, the IAB node 240 could be the IAB node 170-1 and the child node 250 could be the IAB node 170-2. However, the parent node 230 could be the IAB node 170-1, the IAB node 240 could be the IAB node 170-2, and the child node 250 could be another IAB node, e.g., 170-3. The transmissions 210 are as follows: transmission 210-1 is a transmission of child BH DL from the IAB node 240 to the child node 250; transmission 210-2 is a transmission of parent BH UL from the IAB node 240 to the parent node 230; and transmission 210-3 is a transmission of DL access (child) from the IAB node 240 to the UE 110. Note that the term "child" in the phrase "DL access (child)" refers to the access radio link that shares the same radio resources with the child BH DL link.

FIG. 2B illustrates an IAB FDM/SDM scenario for an IAB node receiving. The receptions 220 are as follows: reception 220-1 is a reception of a child BH UL from the child node 250 to the IAB node 240; reception 220-2 is a reception of a parent BH DL from the parent node 230 to the IAB node 240; and reception 220-3 is a reception of a UL access (child) from the UE 110 to the IAB node 240.

It is noted that the FDM/SDM scenario can be implemented with one or multiple antenna panels at the IAB node 240. In the single panel scenario, for instance, IAB node 240 needs to process the parent BH link 212 (e.g., parent BH link 112 from FIG. 1A) and child link(s) 213 (e.g., child BH link 113 from FIG. 1A) using the same baseband (this may happen also in the multi-panel scenario). The following issues should be considered in this scenario:

1) Parent BH link 212 and child BH link(s) 213 share common PAs, with potentially reduced DL coverage for the child links (compared to a multi-panel scenario).

2) Tx and Rx timing alignment between parent BH link 212 and child link(s) 213 may be required at the IAB node 240.

3) IAB reception suffers from a power imbalance between the parent BH link 212 and child links 213, as inter-symbol interference needs to be mitigated.

Regarding IAB node synchronization and timing alignment, seven different TX and RX timing configurations for the different links were considered in RAN1, and after RAN1 #94b only three are left for further studies. See the following: "Final Report of 3GPP TSG RAN WG1 #94 v1.0.0, (Gothenburg, Sweden, 20-24 Aug. 2018)", printed as R1-1810051, 3GPP TSG RAN WG1 Meeting #94bis, Chengdu, China, 8-12 Oct. 2018; and "Draft Report of 3GPP TSG RAN WG1 #94bis v0.1.0, Chengdu, China, 8-12 Oct. 2018", submitted as R1-1812101 for 3GPP TSG RAN WG1 Meeting #95, Spokane, USA, 12-16 Nov. 2018. The three that are left for further studies are the following:

In Case #1, this concerns DL transmission timing alignment across IAB-nodes and IAB-donors. If DL TX and UL RX are not exactly aligned at the parent node, besides timing advance commands, additional information about the offset is needed for the child node to properly set its DL TX timing for OTA based timing and synchronization.

In Case #6, this concerns DL transmission timings aligned across IAB nodes and IAB donors and TX timings aligned within a node. The DL transmission timing for all IAB nodes is aligned with the parent IAB node or donor DL timing. The UL transmission timing of an IAB node can be aligned with the IAB node's DL transmission timing.

In Case #7, this concerns DL transmission timings aligned across IAB nodes and IAB donors and RX timings aligned within a node. The DL transmission timing for all IAB nodes is aligned with the parent IAB node or donor DL timing. The UL reception timing of an IAB node can be aligned with the IAB node's DL reception timing. If DL TX and UL RX are not well aligned at the parent node, additional information about the alignment is needed for the child node to properly set its DL TX timing for OTA based timing & synchronization.

All the three remaining configurations include synchronized DL transmissions across the nodes so that the network appears synchronized for the UEs. In two of the configurations (Cases 1 and 7) BH UL TX timing is controlled by timing advance commands in a similar way as UL TX timing of UEs. The difference between Cases 1 and 7 is that in Case 7 the BH UL RX timing is aligned with the BH DL RX timing, while in Case 1 the BH UL RX timing may be in a fixed relation to the DL TX timing. The third timing configuration (Case 6) intends to align the TX timings of an IAB node. This means that the conventional TA control is not in use as BH UL TX timing is tied to BH DL TX timing. The Cases 6 and 7 are intended for supporting FDM/SDM of TX or RX signals.

Figure 3:
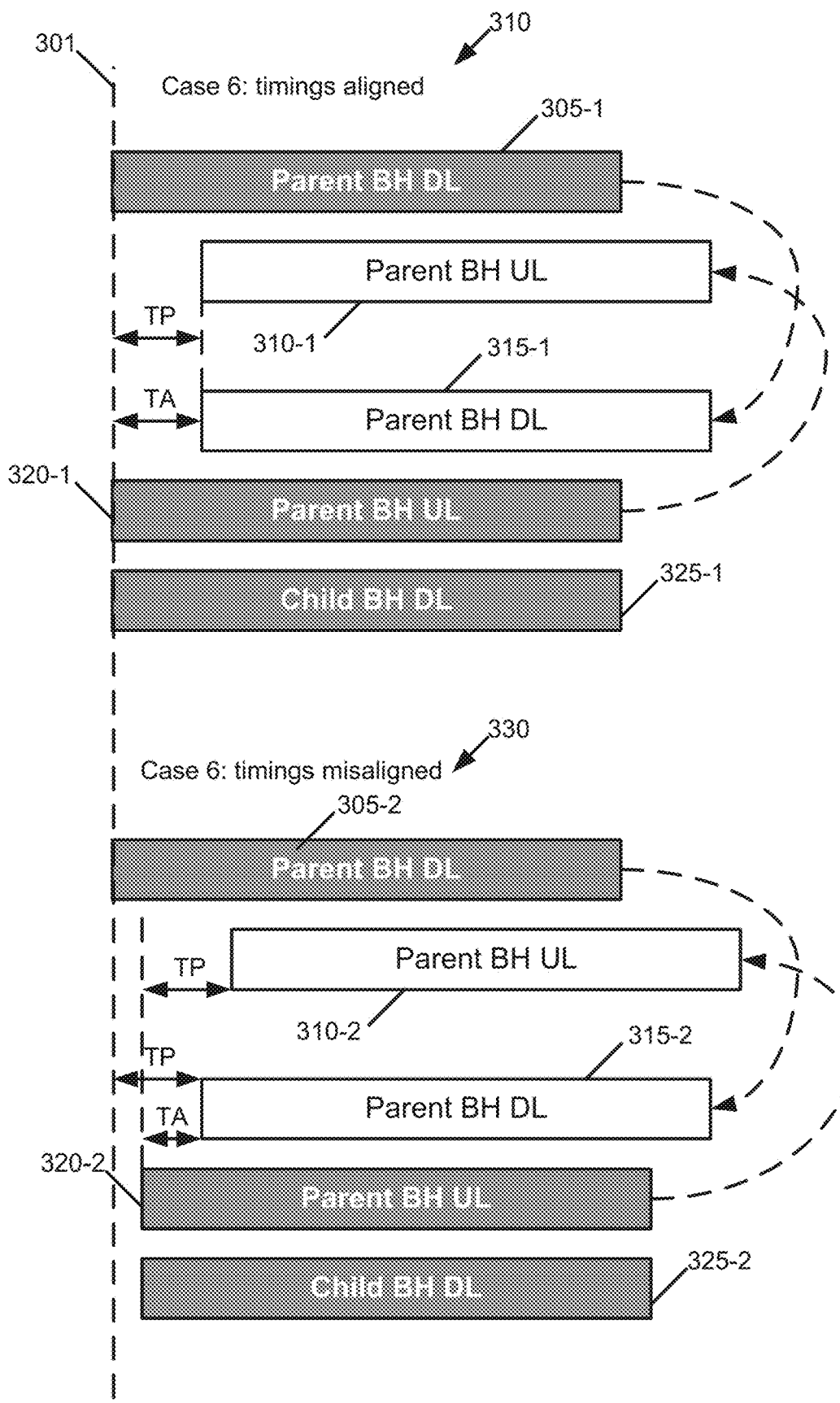
FIG. 3 is a comparison of timing alignment in Cases 1 and 6.

As explained above, the conventional TA determination according to the commands signaled by the receiving node is not available with Case 6. The problem of TA setting in Case 6 is depicted in FIG. 3 that shows in the upper part 310 the ideal situation where IAB node's TX timings are aligned with parent node's TX timings while in the lower part 330 the IAB node uses a too small TA, leading to misaligned transmission timings between the IAB node and its parent node. The darker shading indicates transmission. The naming of the links is from the point of view of the IAB node 240 as in FIG. 2: dark Parent BH DL 305-1 in the upper part (or 305-2 in the lower part) is the signal transmitted by the parent node 230 and it is received propagation delay TP later by the IAB node 240 as shown by the light Parent BH DL 315-1 (or 315-2). The dark Parent BH UL 320-1 (or 320-2) is the signal transmitted by the IAB node 240 and received TP later by the parent node 230 as shown by the light Parent BH UL 310-1 (or 310-2). The transmission timing of Parent BH UL 320-1 (or 320-2) is advanced by TA relative to the reception timing of Parent BH DL 315-1 (or 315-2). Child BH DL 325-1 (or 325-2) is transmitted by the IAB node 240 towards its child node 250. They as well as DL access (child) signal 210-3 (not shown in FIG. 3) may be transmitted with timings aligned to Parent BH UL 320 (e.g., 320-1 or 320-2). The dashed line 301 indicates the TX timing of the parent IAB node 230, where the TX timings of the IAB nodes should be aligned. The two topmost boxes, the Parent BH DL 305-1 (or 305-2) and Parent BU UL 310-1 (or 310-2) represent timing in the IAB node 230, and the other three boxes represent timing in the IAB node 240.

In Case 1, the TA of a child node, controlled by the parent node, consists of two parts: $TA=2*TP+T_{offset}$, where TP is the signal propagation time between parent and child node and $T_{offset}$ is a parameter that could be broadcasted or given in a standard. In addition to setting the BH UL TX timing relative to the BH DL RX timing, TA can be used for over-the-air (OTA) synchronization of the DL TX timings of different nodes. The child node calculates the propagation delay $TP=(TA-T_{offset})/2$, and advances its DL TX timing by TP relative to the RX timing of the parent's DL signal.

It is noted that in Case 7, the TA control is otherwise the same as with Case 1 except that $T_{offset}$ signaled for the child node may vary according to the BH DL RX timing in the parent node.

In Case 6, the BH UL TX timing is tied to the BH DL TX timing. Therefore, the normal TA control is not applied for the BH UL RX timing by the parent node. One exemplary problem solved herein is how to align BH TX timings of a child node with those of its parent node in this situation. The ideal alignment in Case 6 is shown in the upper part of FIG. 3 while the bottom part shows a situation where too small TA is applied by the child node. In this case, the too small TA being applied is a problem in that the parent BH UL and child BH DL do not align. As described above, for Case 6, the DL transmission timing for all IAB nodes is supposed to be aligned with the parent IAB node or donor DL timing, and the too small TA in FIG. 3 yields an incorrect timing. Similarly, incorrect timing appears if the TA is set too large. A problem therefore is to detect such timing misalignments and correct them when a parent does not directly control its child nodes BH UL timing.

The conventional TA setting under the parent node's control has been explained above for Case 1. In addition to this, OTA synchronization is described in 3GPP TR 36.898, "Network assistance for network synchronization" (see 3GPP TR 36.898 V14.0.0 (2017-01)). The method is based on calculating TP from time stamps received from the synchronization source, see FIG. 4. The signal propagation delay is obtained as half of the RTT, equal to $0.5*((T4-T1)-(T3-T2))$.

Figure 4:
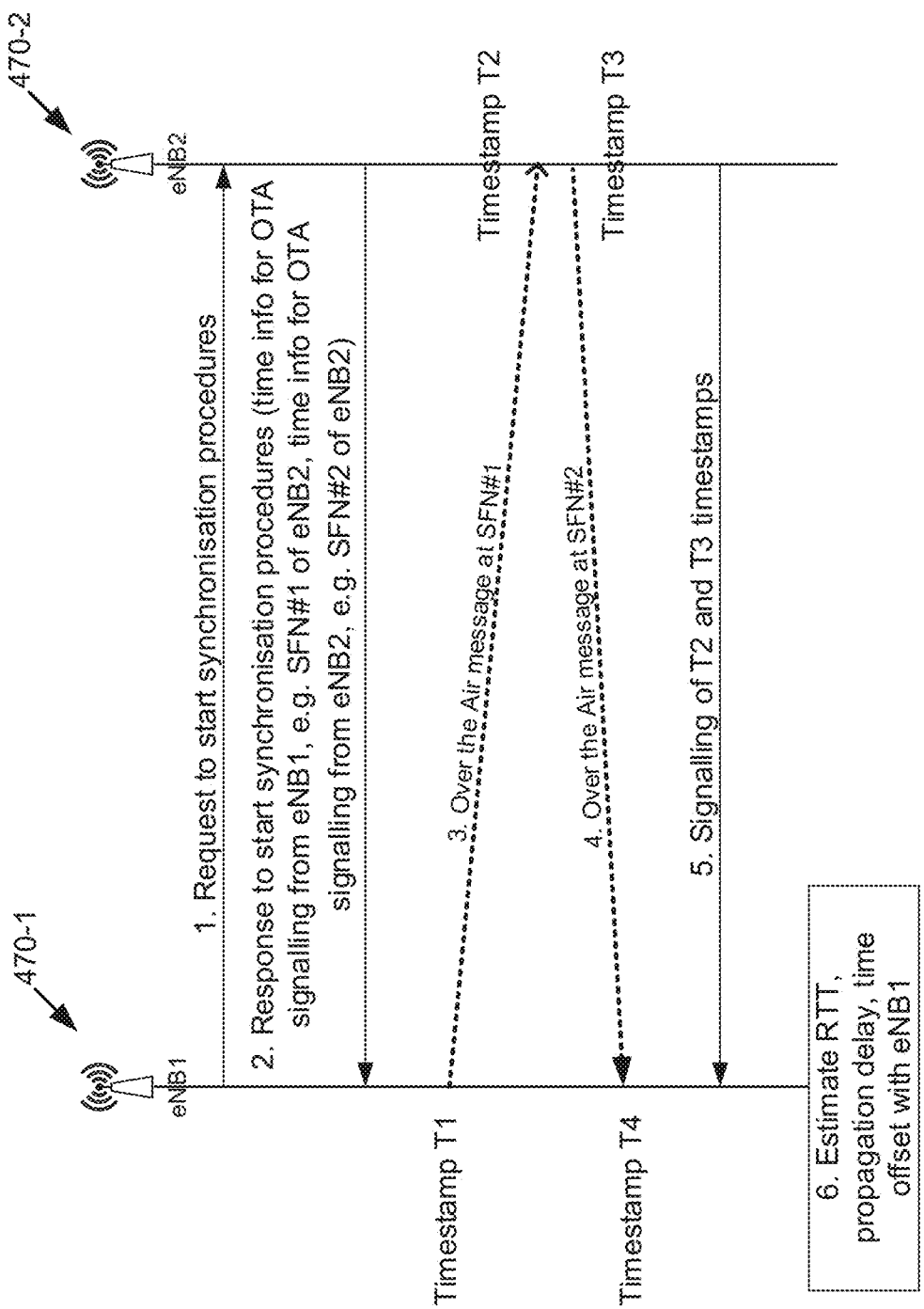
FIG. 4 is a signaling diagram of OTA synchronization for LTE.

In more detail, in FIG. 4, two eNBs are shown, eNB1 470-1 and eNB2 470-2, as is the signaling between these two. In step 1, there is a request from the eNB1 470-1 to the eNB2 470-2 to start synchronization procedures. In step 2, there is a response from eNB2 470-2 to start synchronization procedures, which includes time information (info) for OTA signaling from eNB1, e.g., SFN#1 of eNB2, and time information for OTA signaling from eNB2, e.g., SFN#2 of eNB2. The eNB1 470-1 records a timestamp T1 in response to sending (e.g., at the start of sending) an over the air message at SFN#1 for step 3. In response to reception of the message, the eNB2 470-2 records timestamp T2. The eNB2 470-2 records timestamp T3 in response to sending (e.g., at the start of sending) (see step 4) an over the air message at SFN#2. The eNB1 470-1 records timestamp T4 in response to reception of the message. In step 5, the eNB2 470-2 performs signaling of the T2 and T3 timestamps. In step 6, the eNB1 470-1 estimates RTT, propagation delay, and time offset. As described above, the signal propagation delay is obtained as half of the RTT, equal to $0.5*((T4-T1)-(T3-T2))$, where $RTT=(T4-T1)-(T3-T2)$.

Figure 5:
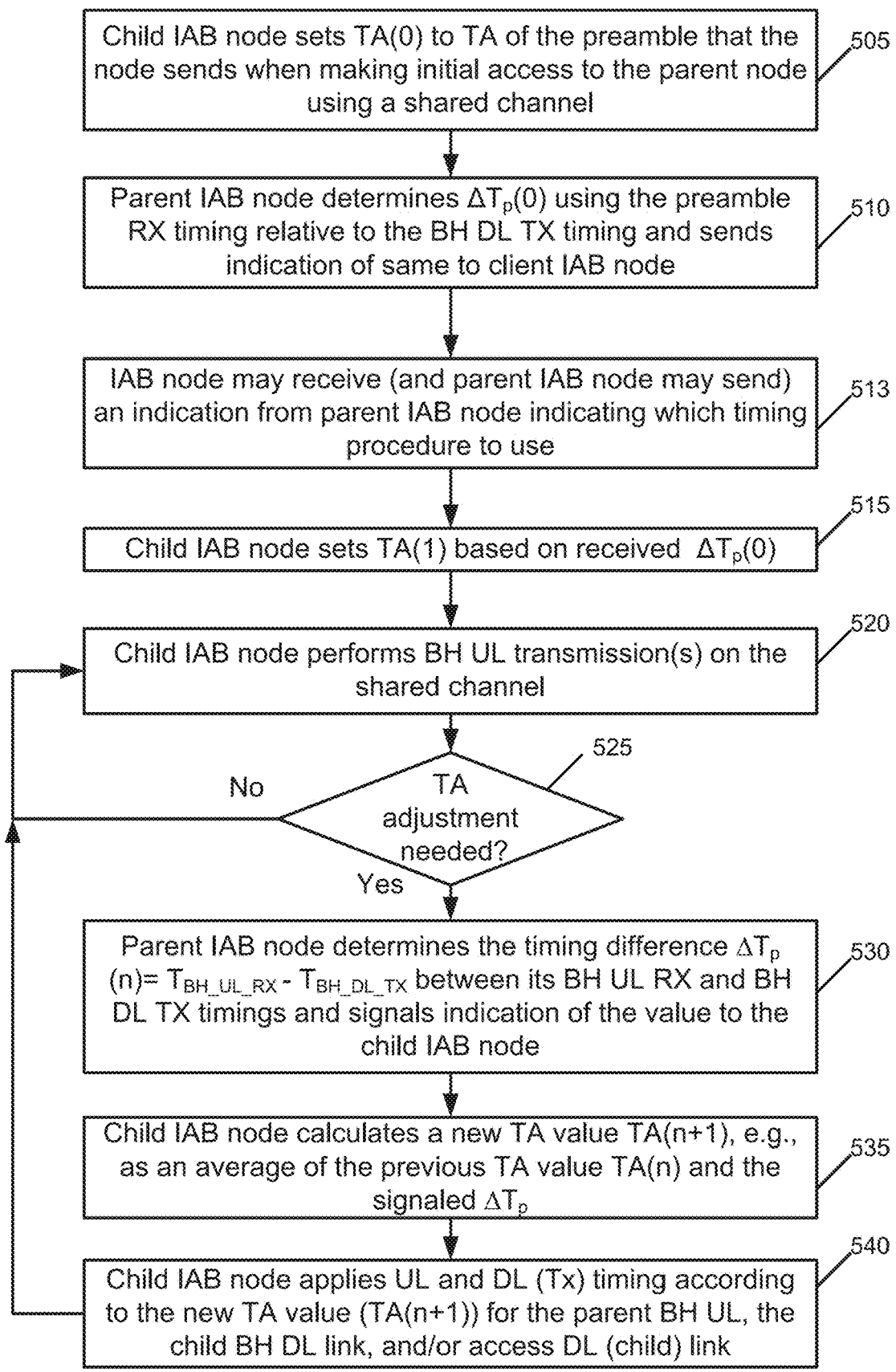
FIG. 5 is a logic flow diagram for timing advance control for IAB, and illustrates the operation of an exemplary method or methods, a result of execution of computer program instructions embodied on a computer readable memory, functions performed by logic implemented in hardware, and/or interconnected means for performing functions in accordance with exemplary embodiments.

An exemplary embodiment herein relates to IAB timing Case #6. An exemplary BH TA control method is as follows. This is explained in reference to FIG. 5, which is a logic flow diagram for timing advance control for IAB. This figure illustrates the operation of an exemplary method or methods, a result of execution of computer program instructions embodied on a computer readable memory, functions performed by logic implemented in hardware, and/or interconnected means for performing functions in accordance with exemplary embodiments. The blocks in this figure may be performed by the corresponding parent IAB node 190 and child IAB node 170-1, e.g., under control in part of a corresponding IAB module 150. In a multi-hop configuration, the blocks may be performed also by IAB node 170-1 and its child IAB node 170-2. IAB node 170-1 would then have a dual role: it would be the child node when performing the blocks together with its parent node 190 and a parent node when performing the blocks with its child node 170-2.

In block 505, the first TA value, TA(0), of the child IAB node is the TA of the preamble that the child node sends when making initial access to the parent node, e.g., utilizing first a random access procedure using the random access channel (RACH) and then the physical uplink shared channel (PUSCH). The preamble is sent at the RX timing of the parent's BH DL signal, e.g., TA(0)=0.

In block 510, the parent IAB node determines $\Delta T_p(0)$ using the preamble RX timing relative to the BH DL TX timing and sends an indication of the same to the child IAB node. It is noted that the IAB node may receive (and the parent IAB node may send) an indication from parent IAB node indicating which timing procedure to use. This is illustrated by block 513. For example, the IAB node may receive an indication that the timing procedure where Tx timing of UL parent BH and DL child BH/Access is aligned with each other, e.g., as illustrated above in FIG. 3. This indication may be received, e.g., via higher layer signaling. The timing procedure may be connected to the multiplexing approach used. For example, current timing (Case #6) may be used in the case of FDM/SDM multiplexing between parent BH and child BH/Access.

In the preamble response the child node receives the following:

$$TA(1)=\Delta T_p(0)/2,$$

where $\Delta T_p(0)$ is the preamble RX timing relative to the BH DL TX timing. Note also that it makes no difference whether $\Delta T_p(0)$ or TA(0) is received. The procedure can be specified either way. In block 515, the child node sets the TA(1) based on received $\Delta T_p(0)$ (e.g., or the received TA(0)). The child node uses TA(1) for the first BH UL transmission (and subsequent transmissions) on the physical uplink shared channel (PUSCH), see block 520. Up to this point the procedure is similar to UE initial access.

An alternative is that the access procedure is up to this point exactly the same as with UEs. This would be the situation if preamble transmission would not reveal, e.g. by RACH resource selection, that the access attempt is made by an IAB node instead of an UE. Then signaling on uplink shared channel would be used for indicating that the accessing device is an IAB node. This would mean that the IAB node would initially operate like a UE and when the node would be switched to operate as an IAB node, the TA setting should take into account the timing offset applied by UEs: $TA(m)=(TA(m-1)-T_{offset})/2$, where TA(m) is the timing advance that the node uses for setting TX timing for IAB operation, TA(m−1) is the timing advance when still operating like a UE, and $T_{offset}$ is a standardized or broadcasted value that corresponds to UE TA when the propagation delay TP=0. Here it is assumed that for positive $T_{offset}$ the preamble transmission is advanced relative to the RX timing of parents DL signal.

Yet another alternative is that IAB nodes transmit random access preambles with the same timing as UEs do, but already the first transmission on physical uplink shared channel is performed with IAB case 6 timing. Then, for preambles, $TA(0)=T_{offset}$ and, for the first transmission on the physical uplink shared channel, $TA(1)=(\Delta T_p(0)+T_{offset})/2$. Here it is again assumed that for positive $T_{offset}$ the preamble transmission is advanced relative to the RX timing of parents DL signal. This alternative could be in use, e.g., if the IAB nodes and UEs share the same RACH frequency and time resources but use different sequences so that sequence selection indicates whether the preamble is sent by a UE or an IAB node.

In block 525, it is determined whether a TA adjustment is needed. In an exemplary embodiment, the parent node sends $\Delta T_p$ and the child node compares that with TA. If equal, no timing adjustment is needed. Subsequent TA adjustments that are needed may be due to, e.g., node movements, oscillator drifts, frequency offsets or measurement errors. If a TA adjustment is not needed (block 525=No), the flow proceeds to block 520, where additional communications take place using the current TA. If a TA adjustment is needed (block 525=Yes), these TA adjustments may be performed according to the following.

In block 530, the parent IAB node measures the timing difference $\Delta T_p(n)=T_{BH\_UL\_RX}-T_{BH\_DL\_TX}$ between its BH UL RX and BH DL TX timings, and signals an indication of this value to the child IAB node. The n refers to the n-th adjustment. The parent node decides how often adjustments are performed. For instance, the rate of sending $\Delta T_p$ could determine that.

In block 535, the child IAB node calculates a new TA value TA(n+1), e.g., as an average of the old TA value TA(n) and the signaled $\Delta T_p$: $TA(n+1)=(TA(n)+\Delta T_p(n))/2$.

In block 540, the child IAB node applies UL and DL (Tx) timing according to the new TA value (TA(n+1)) for the parent BH UL, the child BH DL link, and/or access DL (child) link By definition, TA is the advancement of BH UL TX timing relative to the BH DL signal reception timing. Especially with Case 6, TA is also advancement of DL TX timings relative to the BH DL signal reception timing, as that way all the TX timings of a node are aligned. That is, in one exemplary embodiment, the BH UL (sent towards parent) signal TX timing is advanced by the TA, relative to the BH DL (coming from parent) RX timing. The child BH DL link and/or access DL (child) link may be similarly advanced by the TA, relative to the BH DL (coming from parent) RX timing.

Figure 6:
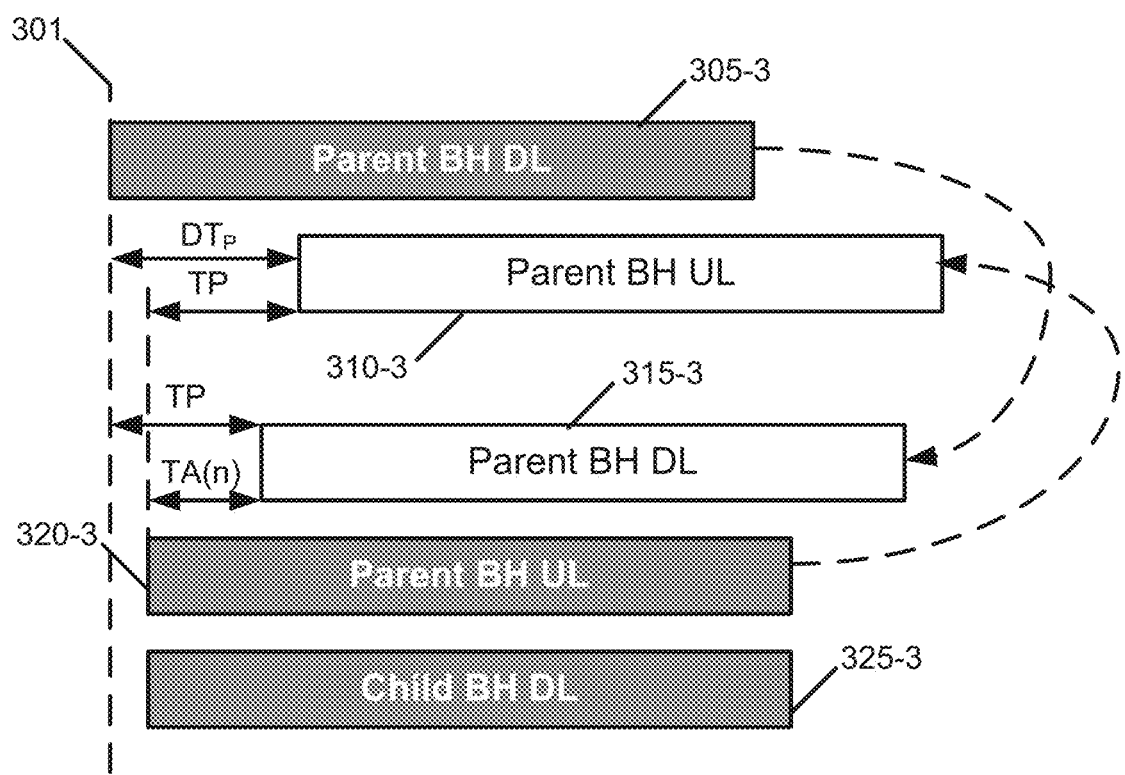
FIG. 6 illustrates timing relations for updating TA in accordance with an exemplary embodiment.

The timing relations for correcting TA that is set too small are shown in FIG. 6. This figure shows the Parent BH DL 305-3, the Parent BH UL 310-3, the Parent BH DL 315-3, the Parent BH UL 320-3, and the Child BH DL 325-3, similar to those signals shown in the timings misaligned portion 330 of FIG. 3. If response to TA(n) being too small, a procedure (e.g., from FIG. 5) is followed so that TA(n+1) will be larger. This means the child IAB node moves its TX timings earlier as compared with the reception timing of the signal coming from the parent node. This means that, after the TA adjustment, the parent node will see smaller $\Delta T_p$. If the adjustment is made according to the equations given above, when parent next time sends $\Delta T_p$, it will be equal to TA(n+1). That is, with this procedure, the TA can be controlled to be equal to propagation TP. Because DL and UL TX timings are aligned in Case 6, this means that also DL transmissions of parent and child are aligned. In the opposite case of too large TA(n), the same procedure leads to TA(n+1)<TA(n).

Compared with the conventional TA control, one difference is that the TA updates are calculated by the child node rather than received directly from the parent node.

Figure 7B:
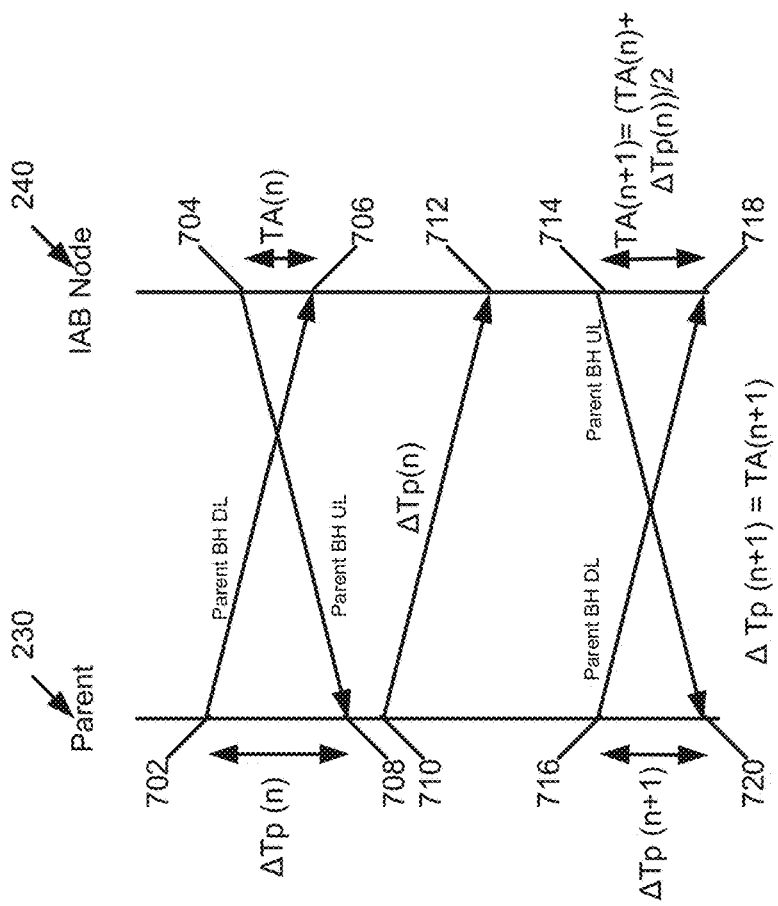
FIG. 7B illustrates signaling and corresponding timing in accordance with an exemplary embodiment herein.
Figure 7A:
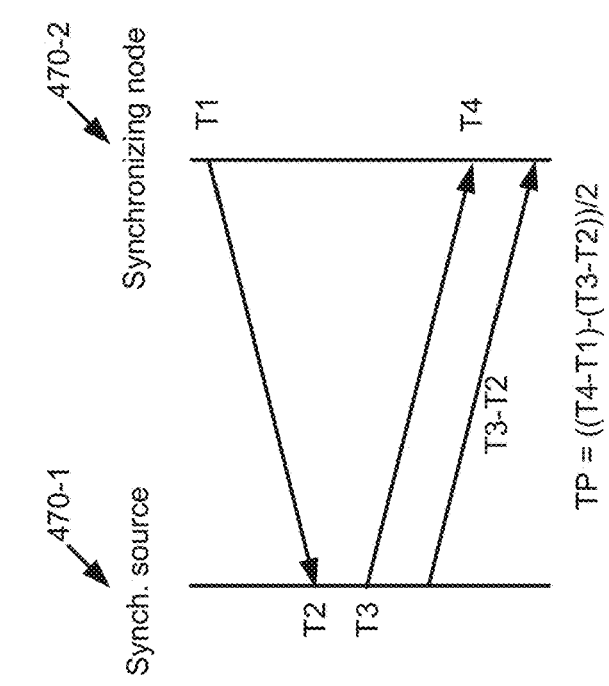
FIG. 7A illustrates signaling and corresponding timing for an LTE OTA system using the techniques of FIG. 4.

Compared with the LTE OTA synchronization system in 3GPP TR 36.898, one difference is that the OTA synchronization is basically an RTT determination while the technique presented in an exemplary embodiment is based on equalizing two time differences that are observed in different nodes, see FIGS. 7A and 7B. In FIG. 7A, this figure illustrates signaling and corresponding timing for an LTE OTA system using the techniques of FIG. 4. The signal propagation delay TP=((T4−T1)−(T3−T2))/2.

By contrast, FIG. 7B illustrates signaling and corresponding timing in accordance with an exemplary embodiment herein. A parent IAB node 230 and an IAB node 240 are shown. As described above, the parent node 230 could be the IAB donor node 190 and the IAB node 240 could be the IAB node 170-1. However, the parent node 230 could be the IAB node 170-1, and the IAB node 240 could be the IAB node 170-2. In this example, the parent IAB node 230 transmits (at reference 702) the parent BH DL signal to the IAB node 240, and the IAB node 240 receives this at reference 706. In the meantime, the IAB node 240 transmits (at reference 704) the parent BH UL signal to the IAB node 230, which receives (at reference 708) the signal. TA(n) is calculated using the difference in time between the times at which references 704 and 708 occurred. The timing difference $\Delta T_p(n)$ is calculated using the difference in time between the times at which references 708 and 702 occurred.

Another cycle is also shown. The parent IAB node 230 transmits (at reference 716) the parent BH DL signal to the IAB node 240, and the IAB node 240 receives this at reference 718. In the meantime, the IAB node 240 transmits (at reference 714) the parent BH UL signal to the IAB node 230, which receives (at reference 720) the signal. TA(n+1) is calculated using TA(n+1)=(TA(n)+$\Delta T_p$(n))/2. The timing difference $\Delta T_p(n+1)$ is calculated using the difference in time between the times at which references 716 and 720 occurred. The end of this process may be such that $\Delta T_p$(n+1)=TA(n+1).

A timing difference $\Delta T_p$ can be signaled (see block 513 of FIG. 5), e.g., in a MAC CE the same way as TA update commands are signaled for a UE by a gNB. Other signaling is also possible. The UE TA commands are given as differences to the old TA setting, but $\Delta T_p$ should be given as an absolute value: if only a change relative to the earlier $\Delta T_p$ would be signaled, missing a $\Delta T_p$ update would have a permanent effect on DL timing of the child node. As TA updates, signaled for UEs, are differential, a small range of values need to be covered and therefore the update can be signaled with, e.g., 6 bits. However, a larger range is needed for signaling timing difference $\Delta T_p$, and for that the signal structure being used for TA signaling in the random-access response could be applied.

Rather than correcting TA in one shot, a more gradual adjustment could be useful for smoother control:

$$TA(n+1)=TA(n)+\varepsilon*(\Delta T_p(n)-TA(n)),$$

where the coefficient $\varepsilon$ is smaller than 0.5.

The following are additional examples.

Example 1

A method, comprising:
receiving an indication of a timing difference over a wireless backhaul link, the indication received at a first node in a wireless communication system and received from a second node in the wireless communication system, the timing difference between a first time at which the second node received uplink signal on the wireless backhaul link from the first node and a second time at which the second node transmitted downlink signal on the wireless backhaul link to the first node;
determining by the first node a new timing advance based on a current timing advance and on the received timing difference; and
using the determined new timing advance for one or more transmissions by the first node over one or wireless links.

Example 2

The method of example 1, wherein receiving the indication of the timing difference further comprises receiving the indication using signaling comprising a control element for medium access control having the indication.

Example 3

The method of any of examples 1 or 2, wherein receiving the indication of the timing difference further comprises receiving the indication using a signal structure defined for timing correction in a random-access response.

Example 4

The method of any of examples 1 to 3, wherein determining by the first node the new timing advance based on the current timing advance and on the received timing difference further comprises the first node determining the new timing advance as an average of the current timing advance and the timing difference.

Example 5

The method of example 4, wherein the new timing advance is TA(n+1), and where the determining the new timing advance uses TA(n+1)=(TA(n)+$\Delta Tp(n)$)/2, wherein TA(n) is the current timing advance and $\Delta Tp(n)$ is the timing difference.

Example 6

The method of example 4, wherein the new timing advance is TA(n+1), and where the determining the new timing advance uses TA(n+1)=TA(n)+$\varepsilon*(\Delta Tp(n)-TA(n))$, wherein TA(n) is the current timing advance, $\Delta Tp(n)$ is the timing difference, and $\varepsilon$ is a coefficient smaller than 0.5.

Example 7

The method of any of examples 1 to 6, wherein using the determined new timing advance for one or more transmissions comprises the first node applying timing according to the new timing advance for the one or more transmissions.

Example 8

The method of example 7, wherein the first node applying timing according to the new timing advance for the one or more transmissions comprises moving the one or more transmissions in time by the new timing advance relative to a reception timing of a downlink transmission received from the second node.

Example 9

The method of any of examples 1 to 8, wherein using the determined new timing advance further comprises using the determined new timing advance for uplink transmissions over the wireless backhaul link to the second node.

Example 10

The method of any of examples 1 to 9, wherein using the determined new timing advance further comprises using the determined new timing advance for downlink transmissions over one of the one or more wireless links to another node.

Example 11

The method of any of examples 1 to 10, wherein using the determined new timing advance further comprises using the determined new timing advance for downlink transmissions over one of the one or more wireless links to a user equipment.

Example 12

The method of any of examples 1 to 11, wherein the first node transmits one or more downlink transmissions and one or more uplink transmissions over the wireless link at a same timing, and frequency division multiplexed and/or space division multiplexed with each other.

Example 13

A method, comprising:
receiving, from a first node and at a second node, uplink signal on a wireless backhaul link between the first and second nodes, wherein the first and second nodes are in a wireless communication system;
determining at the second node a first time at which the uplink signal was received;
determining at the second node a second time at which the second node transmitted a downlink signal;
determining at the second node a timing difference between the first time and the second time;
transmitting an indication of the timing difference from the second node toward the first node for the first node to use in determining a timing advance for timing of transmissions by the first node to another node over one or more wireless links.

Example 14

The method of example 13, wherein transmitting the indication of the timing difference further comprises transmitting the indication using signaling comprising a control element for medium access control having the indication.

Example 15

The method of any of examples 13 or 14, wherein transmitting the indication of the timing difference further comprises transmitting the indication using a signal structure defined for timing correction in a random-access response.

Example 16

A computer program, comprising code for performing the methods of any of examples 1 to 15, when the computer program is run on a processor.

Example 17

The computer program according to example 16, wherein the computer program is a computer program product comprising a computer-readable medium bearing computer program code embodied therein for use with a computer.

Example 18

The computer program according to example 16, wherein the program is directly loadable into an internal memory of the computer.

Example 19

An apparatus, comprising:
means for receiving an indication of a timing difference over a wireless backhaul link, the indication received at a first node in a wireless communication system and received from a second node in the wireless communication system, the timing difference between a first time at which the second node received uplink signal on the wireless backhaul link from the first node and a second time at which the second node transmitted downlink signal on the wireless backhaul link to the first node;
means for determining by the first node a new timing advance based on a current timing advance and on the received timing difference; and
means for using the determined new timing advance for one or more transmissions by the first node over one or wireless links.

Example 20

The apparatus of example 19, wherein the means for receiving the indication of the timing difference further comprises means for receiving the indication using signaling comprising a control element for medium access control having the indication.

Example 21

The apparatus of any of examples 19 or 20, wherein the means for receiving the indication of the timing difference further comprises means for receiving the indication using a signal structure defined for timing correction in a random-access response.

Example 22

The apparatus of any of examples 19 to 21, wherein the means for determining by the first node the new timing advance based on the current timing advance and on the received timing difference further comprises means for determining, in the first node, the new timing advance as an average of the current timing advance and the timing difference.

Example 23

The apparatus of example 22, wherein the new timing advance is $TA(n+1)$, and where the means for determining the new timing advance uses $TA(n+1)=(TA(n)+\Delta Tp(n))/2$, wherein $TA(n)$ is the current timing advance and $\Delta Tp(n)$ is the timing difference.

Example 24

The apparatus of example 22, wherein the new timing advance is $TA(n+1)$, and where the means for determining the new timing advance uses $TA(n+1)=TA(n)+\varepsilon^*(\Delta Tp(n)-TA(n))$, wherein $TA(n)$ is the current timing advance, $\Delta Tp(n)$ is the timing difference, and c is a coefficient smaller than 0.5.

Example 25

The apparatus of any of examples 19 to 25, wherein using the determined new timing advance for one or more transmissions comprises the first node applying timing according to the new timing advance for the one or more transmissions.

Example 26

The apparatus of example 25, wherein the first node applying timing according to the new timing advance for the one or more transmissions comprises moving the one or more transmissions in time by the new timing advance relative to a reception timing of a downlink transmission received from the second node.

Example 27

The apparatus of any of examples 19 to 26, wherein the means for using the determined new timing advance further comprises means for using the determined new timing advance for uplink transmissions over the wireless backhaul link to the second node.

Example 28

The apparatus of any of examples 19 to 27, wherein the means for using the determined new timing advance further comprises means for using the determined new timing advance for downlink transmissions over one of the one or more wireless links to another node.

Example 29

The apparatus of any of examples 19 to 28, wherein the means for using the determined new timing advance further comprises means for using the determined new timing advance for downlink transmissions over one of the one or more wireless links to a user equipment.

Example 30

The apparatus of any of examples 19 to 29, wherein the first node transmits one or more downlink transmissions and one or more uplink transmissions over the wireless link at a same timing, and frequency division multiplexed and/or space division multiplexed with each other.

Example 31

An apparatus, comprising:
means for receiving, from a first node and at a second node, uplink signal on a wireless backhaul link between the first and second nodes, wherein the first and second nodes are in a wireless communication system;
means for determining at the second node a first time at which the uplink signal was received;
means for determining at the second node a second time at which the second node transmitted a downlink signal;
means for determining at the second node a timing difference between the first time and the second time;
means for transmitting an indication of the timing difference from the second node toward the first node for the first node to use in determining a timing advance for timing of transmissions by the first node to another node over one or more wireless links.

Example 32

The apparatus of example 31, wherein the means for transmitting the indication of the timing difference further comprises means for transmitting the indication using signaling comprising a control element for medium access control having the indication.

Example 33

The apparatus of any of examples 31 or 32, wherein the means for transmitting the indication of the timing difference further comprises means for transmitting the indication using a signal structure defined for timing correction in a random-access response.

Example 34

A wireless communication system comprising any of the apparatus of examples 19 to 30 and any of the apparatus of examples 31 to 33.

Example 35

An apparatus, comprising:
at least one processor; and
at least one memory including computer program code,
the at least one memory and the computer program code configured, with the at least one processor, to cause the apparatus to perform operations comprising:
receiving an indication of a timing difference over a wireless backhaul link, the indication received at a first node in a wireless communication system and received from a second node in the wireless communication system, the timing difference between a first time at which the second node received uplink signal on the wireless backhaul link from the first node and a second time at which the second node transmitted downlink signal on the wireless backhaul link to the first node;
determining by the first node a new timing advance based on a current timing advance and on the received timing difference; and
using the determined new timing advance for one or more transmissions by the first node over one or wireless links.

Example 36

The apparatus of example 19, wherein the at least one memory and the computer program code are configured, with the at least one processor, to cause the apparatus to perform operations of any of the methods of examples 2 to 12.

Example 37

An apparatus, comprising:
at least one processor; and
at least one memory including computer program code,
the at least one memory and the computer program code configured, with the at least one processor, to cause the apparatus to perform operations comprising:
receiving, from a first node and at a second node, uplink signal on a wireless backhaul link between the first and second nodes, wherein the first and second nodes are in a wireless communication system;
determining at the second node a first time at which the uplink signal was received;
determining at the second node a second time at which the second node transmitted a downlink signal;
determining at the second node a timing difference between the first time and the second time;

transmitting an indication of the timing difference from the second node toward the first node for the first node to use in determining a timing advance for timing of transmissions by the first node to another node over one or more wireless links.

Example 38

The apparatus of example 37, wherein the at least one memory and the computer program code are configured, with the at least one processor, to cause the apparatus to perform operations of any of the methods of examples 14 or 15.

Example 39

A computer program product comprising a computer-readable storage medium bearing computer program code embodied therein for use with a computer, the computer program code comprising code for performing any of the methods of examples 1 to 15.

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1C. A computer-readable medium may comprise a computer-readable storage medium (e.g., memories 155 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments of the invention, these descriptions should not be viewed in a limiting sense. Rather, there are several variations and modifications which may be made without departing from the scope of the present invention.

What is claimed is:

1. A method, comprising:
receiving an indication of a timing difference over a wireless backhaul link, the indication received at a first node in a wireless communication system and received from a second node in the wireless communication system, the timing difference between a first time at which the second node received uplink signal on the wireless backhaul link from the first node and a second time at which the second node transmitted downlink signal on the wireless backhaul link to the first node;
determining by the first node a new timing advance based on a current timing advance and on the received timing difference, wherein the determining comprises at least one of:
determining the new timing advance as an average of the current timing advance and the received timing difference; and
determining the new timing advance as $TA(n+1) = TA(n) + \varepsilon*(\Delta T_P(n) - TA(n))$, wherein $TA(n+1)$ is the new timing advance, $TA(n)$ is the current timing advance, $\Delta Tp(n)$ is the received timing difference, and $\varepsilon$ is a coefficient smaller than 0.5; and
using the determined new timing advance for one or more transmissions by the first node over one or more wireless links.

2. The method of claim 1, wherein the indication of the timing difference is received in a control element for medium access control.

3. The method of claim 1, wherein the indication of the timing difference is received in a signal structure defined for timing correction in a random-access response.

4. An apparatus, comprising:
at least one processor; and
at least one memory including computer program code,
the at least one memory and the computer program code configured to, with the at least one processor, cause the apparatus to at least:
receive an indication of a timing difference over a wireless backhaul link, the indication receive at a first node in a wireless communication system and received from a second node in the wireless communication system, the timing difference between a first time at which the second node received uplink signal on the wireless backhaul link from the first node and a second time at which the second node transmitted downlink signal on the wireless backhaul link to the first node;
determine by the first node a new timing advance based on a current timing advance and on the received timing difference, wherein the determining comprises at least one of:

determining the new timing advance as an average of the current timing advance and the received timing difference; and determining the new timing advance as $TA(n+1)=TA(n)+\varepsilon*(\Delta T_p(n)-TA(n))$, wherein $TA(n+1)$ is the new timing advance, $TA(n)$ is the current timing advance, $\Delta Tp(n)$ is the received timing difference, and $\varepsilon$ is a coefficient smaller than 0.5; and use the determined new timing advance for one or more transmissions by the first node over one or more wireless links, wherein the apparatus is comprised in the first node.

5. The apparatus of claim 4, wherein the indication is received in a control element for medium access control.

6. The apparatus of claim 4, wherein the indication is received in a signal structure defined for timing correction in a random-access response.

7. The apparatus of claim 4, wherein the new timing advance is $TA(n+1)$, and where determining the new timing advance uses $TA(n+1)=(TA(n)+\Delta Tp(n))/2$, wherein $TA(n)$ is the current timing advance and $\Delta Tp(n)$ is the timing difference.

8. The apparatus of claim 4, wherein using the determined new timing advance for one or more transmissions by the first node comprises the first node applying timing according to the new timing advance for the one or more transmissions.

9. The apparatus of claim 8, wherein the first node applying timing according to the new timing advance for the one or more transmissions comprises moving the one or more transmissions in time by the new timing advance relative to a reception timing of a downlink transmission received from the second node.

10. The apparatus of claim 4, wherein using the determined new timing advance for one or more transmissions by the first node comprises using the determined new timing advance for uplink transmissions over the wireless backhaul link to the second node.

11. The apparatus of claim 4, wherein using the determined new timing advance for one or more transmissions by the first node comprises using the determined new timing advance for downlink transmissions over one of the one or more wireless links to another node.

12. The apparatus of claim 4, wherein using the determined new timing advance for one or more transmissions by the first node comprises using the determined new timing advance for downlink transmissions over one of the one or more wireless links to a user equipment.

13. The apparatus of claim 4, wherein using the determined new timing advance for one or more transmissions by the first node comprises the first node transmits one or more downlink transmissions and one or more uplink transmissions over the wireless link at a same timing, and frequency division multiplexed and/or space division multiplexed with each other.

14. An apparatus, comprising:
at least one processor; and
at least one memory including computer program code,
the at least one memory and the computer program code configured to, with the at least one processor, cause the apparatus to at least:
receive, from a first node and at a second node, uplink signal on a wireless backhaul link between the first and second nodes, wherein the first and second nodes are in a wireless communication system;
determine, at the second node, a first time at which the uplink signal was received;
determine, at the second node, a second time at which the second node transmitted a downlink signal;
determine, at the second node, a timing difference between the first time and the second time;
transmit, from the second node, an indication of the timing difference toward the first node for the first node to use in determining a timing advance for timing of transmissions by the first node to another node over one or more wireless links, wherein for the first node to use in determining a timing advance comprises at least one of:
determining the new timing advance as an average of the current timing advance and the received timing difference; and
determining the new timing advance as $TA(n+1)=TA(n)+\varepsilon*(\Delta T_p(n)-TA(n))$, wherein $TA(n+1)$ is the new timing advance, $TA(n)$ is the current timing advance, $\Delta Tp(n)$ is the received timing difference, and $\varepsilon$ is a coefficient smaller than 0.5; wherein the apparatus is comprised in the second node.

15. The apparatus of claim 14, wherein the indication of the timing difference is transmitted in a control element for medium access control.

16. The apparatus of claim 14, wherein the indication of the timing difference is transmitted in a signal structure defined for timing correction in a random-access response.

* * * * *